United States Patent [19]

Sobti et al.

[11] Patent Number: 5,146,538
[45] Date of Patent: Sep. 8, 1992

[54] COMMUNICATION SYSTEM AND METHOD WITH VOICE STEERING

[75] Inventors: Arun Sobti, Wheaton; Richard A. Comroe, Dundee, both of Ill.

[73] Assignee: Motorola, Inc., Schaumburg, Ill.

[21] Appl. No.: 402,017

[22] Filed: Aug. 31, 1989

[51] Int. Cl.⁵ .......................... G10L 7/08; H04M 1/64
[52] U.S. Cl. ......................................... 395/2; 379/88; 381/43
[58] Field of Search .................... 381/43–45; 364/513.5; 379/56, 58, 63, 353, 355, 88; 455/78, 79

[56] References Cited

U.S. PATENT DOCUMENTS

| | | | |
|---|---|---|---|
| 2,064,938 | 12/1936 | Monk | 379/58 |
| 4,247,947 | 1/1981 | Miyamoto | 379/58 |
| 4,737,976 | 4/1988 | Borth et al. | 381/46 |
| 4,896,346 | 1/1990 | Belfield et al. | 379/88 |
| 4,905,288 | 2/1990 | Gerson et al. | 381/43 |
| 4,959,855 | 9/1990 | Daudelin | 379/88 |
| 4,975,941 | 12/1990 | Morganstein et al. | 379/88 |
| 4,975,957 | 12/1990 | Ichikawa et al. | 381/36 |
| 4,998,291 | 3/1991 | Marui et al. | 455/89 |

Primary Examiner—Michael R. Fleming
Assistant Examiner—Michelle Doerrler
Attorney, Agent, or Firm—John W. Hayes; Steven G. Parmelee

[57] ABSTRACT

A communication system supporting dispatch-like communications in a geographic reuse system environment. An originating user provides a verbal alias corresponding to a target communication unit. The system utilizes the verbal alias to locate a corresponding system identification code for the target unit. The system then determines the general whereabouts of the target unit, and establishes a communication path between the two units. The original voice message may be stored and subsequently transmitted to the target unit upon properly identifying, locating, and establishing a communication path to the target unit.

14 Claims, 1 Drawing Sheet

COMMUNICATION SYSTEM AND METHOD WITH VOICE STEERING

TECHNICAL FIELD

This invention relates generally to communication systems, and particularly to communication systems having multiple transmitter sites.

BACKGROUND OF THE INVENTION

Communication systems having multiple transmitter sites, such as cellular telephone systems, are known in the art. In such a system, a user typically contacts another user by entering an identification code, such as a telephone number, to identify the second user. With this information, the system then establishes a communication path between the two users, and a conversation (or other mode of communication) then ensues.

Dispatch communication systems are also known. In such a system, a user will typically not enter a specific code to identify a specific user. Instead, the user's communication unit will have predetermined talk groups programmed into it to automatically provide the system with the appropriate information to allow establishment of a dispatch call. Therefore, the user often simply keys the microphone and begins talking without the need for any dialing or manual user selection mechanisms at all. The intended listener, being a member of the defined talk group (and all other members of the same talk group), will generally receive this voice communication, and the communication path establishment protocol is substantially transparent to the users.

To date, there have been no systems that combine the spectral efficiencies of geographic reuse (as typified in the cellular telephone infrastructure) with the user conveniences offered by a dispatch system. This is primarily because, while most radio dispatch communications are between two particular radio users, these users belong to a talk group having members that can be widely geographically distributed. Therefore, the potential benefits of geographic reuse vanish, as many transmitter sites (cells) must be allocated to support the communication, even though the two users occupy, at most, only two cells.

Accordingly, a need exists for a system that offers at least some of the merits of both types of system.

SUMMARY OF THE INVENTION

This need and others are substantially met through provision of the communication system and method using voice steering as disclosed herein. Pursuant to this invention, a method to facilitate a dispatch communication between a first communication unit and a second communication unit includes three primary steps: receiving a verbal communication that includes identifying information related to the second communication unit; automatically processing at least part of the verbal communication to allow recognition of the identifying information; and automatically providing at least part of the verbal communication to the second communication unit.

In one embodiment of this invention, the verbal information that relates to the second communication unit comprises an enunciated alias for that second communication unit. For example, if the driver of the second communication unit was named Mort, then "Mort" could be used as an enunciated alias. The verbal communication could also include other information intended for the user, such as, "Mort, why aren't you on schedule?"

In one embodiment of the invention, a speech recognition facility can be provided at either the site of the first user, or at an infrastructure location that receives a transmission from the first communication unit that includes the verbal communication. In either event, speech recognition techniques can be employed to recognize the identifying information, and to compare this information, once recognized, in an alias data base to obtain the assigned identification number for the target unit. For example, the speech recognition facility can recognize the enunciation "Mort" as Mort, and an appropriate controller can then access a data base to ascertain that Mort corresponds to identification number 1301.

In one embodiment of this invention, the controller can then use the identification information to locate the target unit, and to establish a communication path thereto. Once established, the stored verbal communication can then be transmitted from the infrastructure base site to the target unit, such that the target unit will receive the verbal communication and render it audible for its user.

So configured, the originating user need not concern himself with a particular call initiation protocol. Instead, a traditional dispatch call is effectuated with only minimal requirements regarding initial identification of the target unit (or group).

BEST MODE FOR CARRYING OUT THE INVENTION

Figure 1:
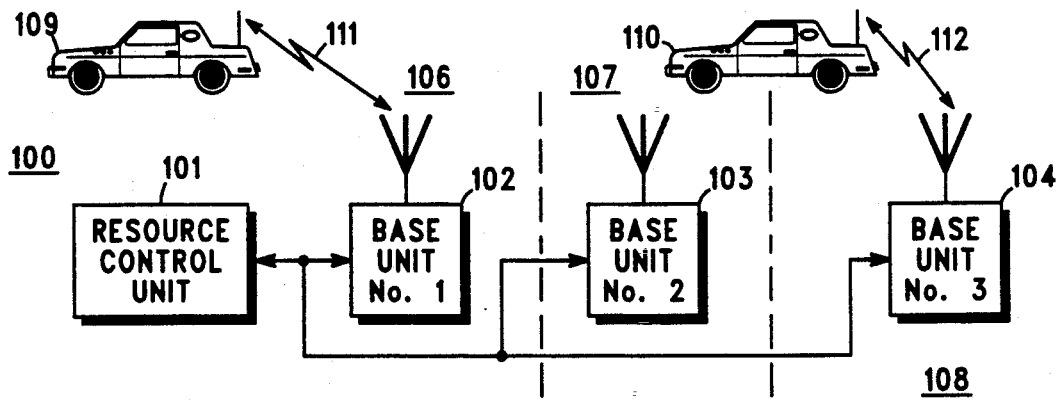
FIG. 1 comprises a block diagram depiction of a system constructed in accordance with the invention.
Figure 2:
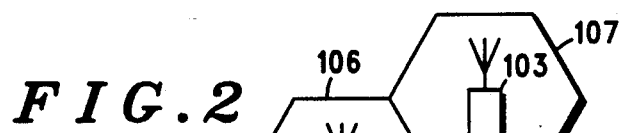
FIG. 2 comprises another block diagram depiction of a system constructed in accordance with the invention.

A multi-base site system is depicted in FIG. 1 as generally denoted by the reference numeral 100. For purposes of this description, the system (100) has three base units (102, 103, and 104). The base units comprise repeaters and are capable of transceiving on a plurality of frequenies, as typically found in a dispatch trunked or cellular radio telephone communication system. The base units are disposed in differing geographic regions (106, 107, and 108) as perhaps better illustrated in FIG. 2. As a result, a communication unit may require the facilities of two base units in order to establish a communication link with another communication unit.

The various base units are generally controlled by a resource control unit (101) such as a central controller in a trunked communication system. The resource control unit (101) has many functions, including the appropriate allocation of communication resources on an as-needed basis to facilitate communications between communication units. Such functions, of course, are well understood by those skilled in the art, and hence a more detailed description will not be provided here.

Figure 3:
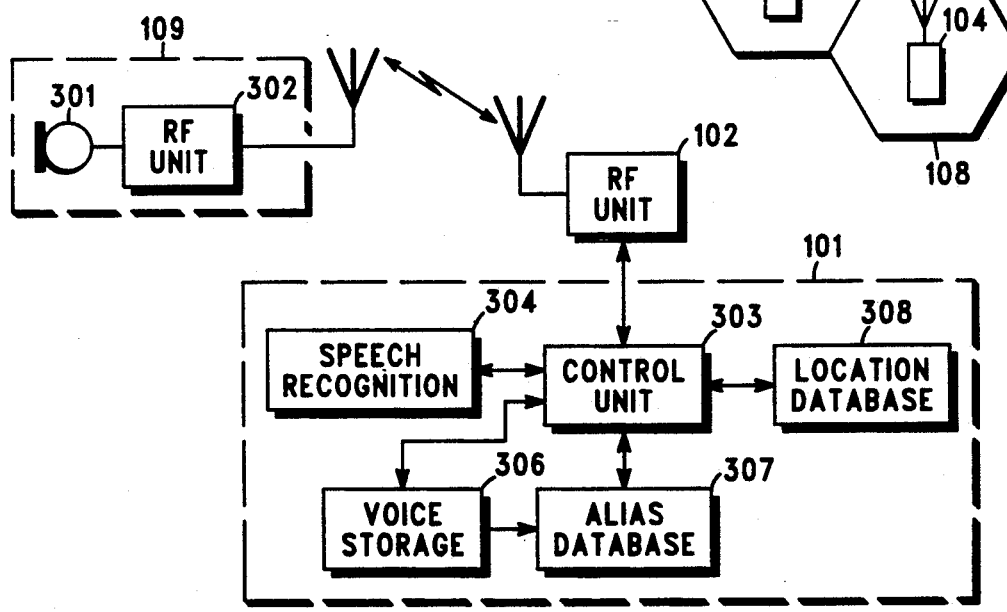
FIG. 3 comprises a block diagram depiction of one embodiment for an originating unit and system infrastructure.

Referring now to FIG. 3, each communication unit (109) includes a microphone (301) for transducing voice signals from a user into corresponding electric signals.

These signals are provided to an appropriate RF unit (302) that functions to process these signals in a manner suitable to allow their subsequent transmission as a modulated signal on a carrier. (Pursuant to this invention, it is appropriate that the voice signals be rendered in digitized form at some point prior to subsequent processing by the system infrastructure. This digitization may either occur in the RF unit (302) prior to transmission, or subsequent to reception by the system infrastructure, both in accordance with well understood prior art technique.) In addition, the radio will also usually include a coding unit that will cause an automatic transmission of digital information that serves to identify the requesting communication unit. This identifying information can be used by the system to establish the communication path between the requesting unit and the target unit. The provision of such information is well understood in the art, and no further explanation of such signalling need be provided here.

The transmitted signals are received by an appropriate base unit RF unit (102), and thereafter provided to the resource control unit (101). Relevant to this invention, the resource control unit (101) includes a control unit (303) having an appropriate microprocessor and other corresponding support circuitry as appropriate to a particular application. In addition, the resource control unit (101) includes a speech recognition unit (304), a voice storage unit (306), an alias data base (307), and a location data base (308).

The speech recognition unit (304) may be comprised of any of a plurality of known speech recognition facilities. In general, these mechanisms function to receive a digitized speech sample (or to digitize an analog speech sample) and process this sample against one or more stored templates. Upon determining a requisite correspondence between the speech sample and one of the templates, recognition of the speech sample will occur. Recognition information can then be provided to the control unit, which utilizes this information to access the alias data base (307). The alias data base simply comprises a look-up table that associates various verbal aliases with a corresponding system identification code. So configured, the control unit (303) extracts from the alias data base (307) the appropriate system identification that corresponds to the original verbal alias as enunciated by the user of the first communication unit (109).

Having determined the identity of the requested target unit, the control unit (303) now accesses the location data base (308) to determine the geographic region that currently includes the target unit. Such location information can be developed in a number of known ways. For example, the communication units can be equipped with location determining facilities such as GPS receivers, Loran-C receivers, or dead reckoning equipment. So equipped, the various communication units can determine their own location, and provide this information to the resource controller (101) on either a scheduled, intermittent, or polled basis. In the alternative, the approximate location of each communication unit can be determined by requiring each communication unit to transmit a location deriving signal from time to time, and to note at which base unit this signal is best received. As an alternative to the latter methodology, methods that do not rely upon location databases can be employed, wherein the resource controller can cause a polling request to be issued from all of the base units for this particular target unit. The target unit would then respond with an appropriate identifying signal, and again approximate location could be determined by noting which of the base units received a higher quality response. According to another method, the communication units may be programmed or requested to register their presence as they enter a new cell.

With the identity and location of the target unit known, the resource controller can then transmit, using the base unit most proximal to the target unit, an information message to cause the target unit to begin receiving on a particular frequency and/or TDM time slot. The resource control unit (101) can then cause the original voice message, as previously stored in a voice storage unit (306), to be transmitted to the target unit, such that the original voice message is rendered audible to the user of the target unit.

So configured, the user of the originating unit need only enunciate an appropriate verbal alias to identify a target unit or group. The target unit will receive and render audible the original voice message. The benefits of geographic reuse are attained since only two of the base units are utilized, instead of all available base units, as currently occurs in a trunked dispatch system. At the same time, the manner of initiating and conducting the communication parallels closely and beneficially with standard dispatch practice, and avoids the system access nuisance and obstacles presented by typical cellular telephone systems.

Figure 4:
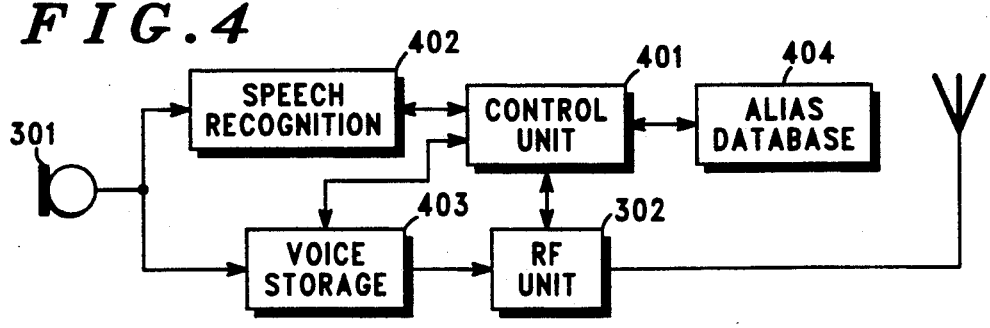
FIG. 4 comprises a second embodiment for an originating unit.

An alternate embodiment for the communication unit has been set forth in FIG. 4. In this embodiment, the communication unit again includes a microphone (301) and an RF unit (302), and now also includes a speech recognition unit (402), a voice storage unit (403), a control unit (401), and an alias data base (404). So configured, recognition of the target unit identification information contained in the voice message occurs in the communication unit itself, as does association of the verbal alias with a system identification code. When the latter information has been deduced, the resultant transmission from the communication unit to the base site may now comprise both the original voice message (as retrieved from the voice storage unit (403)) and a data message that includes the system identification information for the target unit.

If communication units having the above capabilities were provided in a system, then of course the resource control unit (101) would not require the speech recognition unit (304) or the alias data base (307). Instead, only the voice storage unit (306) and the location data base (308) would be required to serve the same functions as set forth above. The primary consideration for determining whether to provide a communication unit as set forth in the first or second embodiment will likely be the computational capabilities that are already provided in a particular communication unit.

The possibility exists, of course, that the system will be unable to recognize a particular verbal alias. In this event, the system will be unable to identify a specific target unit. Nevertheless, the self-identifying information from the requesting communication unit will still be available to the system, and this will at least serve to identify the relevant talk group. This information can be used to address the talk group as a whole. For example, the original message from the requesting unit can be broadcast throughout the system to the entire talk group. Although spectrally inefficient, this backup capability would ensure that important messages are not inhibited due to a verbal alias recognition complication.

What is claimed is:

1. A method of facilitate a dispatch communication between a first communication unit and a second communication unit, comprising the steps of:
   A) receiving a verbal communication intended for reception by the second communication unit that includes verbal identifying information related to the second communication unit;
   B) subsequent to receiving the verbal communication; automatically processing at least part of the verbal communication to allow recognition of the verbal identifying information;
   C) automatically providing at least part of the verbal communication to the second communication unit.

2. The method of claim 1 wherein step C includes automatically providing all of the verbal communication to the second communication unit.

3. The method of claim 1 wherein step C includes automatically providing at least part of the verbal communication to an entire talk group when the automatically processing step fails to allow recognition of the identifying information.

4. A method to facilitate a dispatch communication between a first communication unit and a second communication unit, comprising the steps of:
   at the first communication unit;
   A) receiving a verbal communication intended for reception by the second communication unit that includes verbal identifying information related to the second communication unit;
   B) subsequent to receiving the verbal communication; automatically providing the verbal communication to a control unit;
   at the control unit:
   C) automatically processing at least part of the verbal communication to allow recognition of the verbal identifying information;
   D) automatically providing at least part of the verbal communication to the second communication unit.

5. The method of claim 4 wherein the step of automatically processing includes providing a digital representation of at least that part of the verbal communication that includes the verbal identifying information.

6. The method of claim 5 wherein the verbal identifying information comprises an alias and the step of automatically processing further includes matching the alias to a previously stored identification ID for the second communication unit.

7. The method of claim 6 wherein the step of automatically providing includes using the ID for the second communication unit to identify that the second communication unit is to receive the verbal communication.

8. The method of claim 4 wherein the step of automatically processing includes providing the verbal communication to the second communication unit in digitized form.

9. A method to facilitate a dispatch communication between a first communication unit and a second communication unit, comprising the steps of:
   at the first communication unit:
   A) receiving a verbal communication that includes verbal identifying information related to the second communication unit;
   B) automatically processing at least part of the verbal communication to allow recognition of the verbal identifying information;
   C) processing the verbal identifying information to determine an identification ID for the second communication unit;
   D) automatically transmitting the ID and at least part of the verbal communication.

10. The method of claim 9 and further including the step of:
    at a control site:
    F) receiving the ID and verbal communication.

11. The method of claim 10 and further including the step of:
    at the control unit:
    G) transmitting the ID and verbal communication to the second communication unit.

12. A method to facilitate a dispatch communication between a first communication unit and a second communication unit, comprising the steps of:
    at a control site:
    A) receiving a verbal communication intended for reception by the second communication unit that includes verbal identifying information related to the second communication unit;
    B) subsequent to receiving the verbal communication; automatically processing at least part of the verbal communication to allow recognition of the verbal identifying information;
    C) automatically determining a present location for the second communication unit;
    D) automatically providing at least part of the verbal communication to the second communication unit.

13. The method of claim 12, and further comprising the step of:
    E) automatically rendering the verbal communication audible at the second communication unit.

14. The method of claim 13 wherein the step of automatically providing includes transmitting the verbal communication to the second communication from a transmitter previously associated with the approximate location of the second communication unit.

* * * * *